March 19, 1957 J. J. CHIKA 2,785,922
VEHICLE BODY CONSTRUCTION WITH RETRACTIBLE RIGID TOP
Filed April 15, 1953 6 Sheets-Sheet 1

INVENTOR.
John J. Chika.
BY
Harness, Dickey & Pierce
ATTORNEYS.

March 19, 1957  J. J. CHIKA  2,785,922
VEHICLE BODY CONSTRUCTION WITH RETRACTIBLE RIGID TOP
Filed April 15, 1953  6 Sheets-Sheet 4

INVENTOR.
John J. Chika.
BY
Harness, Dickey & Pierce
ATTORNEYS.

March 19, 1957 J. J. CHIKA 2,785,922
VEHICLE BODY CONSTRUCTION WITH RETRACTIBLE RIGID TOP
Filed April 15, 1953 6 Sheets-Sheet 5

INVENTOR.
John J. Chika.
BY
Harness, Dickey & Pierce
ATTORNEYS.

March 19, 1957        J. J. CHIKA        2,785,922

VEHICLE BODY CONSTRUCTION WITH RETRACTIBLE RIGID TOP

Filed April 15, 1953        6 Sheets-Sheet 6

INVENTOR.
John J. Chika.
BY
Harness, Dickey & Pierce
ATTORNEYS.

United States Patent Office 2,785,922
Patented Mar. 19, 1957

2,785,922

VEHICLE BODY CONSTRUCTION WITH RETRACTIBLE RIGID TOP

John J. Chika, Bloomfield Hills, Mich.

Application April 15, 1953, Serial No. 348,920

7 Claims. (Cl. 296—107)

This invention relates to vehicle constructions and more particularly to an improved vehicle body construction of the convertible top type.

Heretofore, the usual practice has been to provide bodies of the indicated character with a suitably shaped top formed of fabric or other flexible material that may be folded from a closed position to an open position so that the passenger compartment of the vehicle is open to the atmosphere. However, such prior convertible top constructions are subject to the defect that the material forming the flexible top does not provide any substantial protection for the occupants of the vehicle in the event the vehicle is involved in an accident. In addition, when the ambient atmosphere is at a relatively cold temperature, it is difficult to heat the interior of a vehicle having such a flexible top because of the poor insulating qualities and porosity of the flexible material and because of the difficulty in forming a seal between the relatively rigid portions of the body and the material forming the top. Furthermore, such prior convertible top constructions are objectionable in that the material from which the flexible top is constructed has a relatively short life and must be replaced periodically.

Accordingly, an object of the invention is to overcome disadvantages inherent in prior vehicle body constructions of the above mentioned type and to provide an improved vehicle body construction of the convertible top type that affords increased protection to the occupants of the vehicle and which incorporates a substantially inflexible top member that can be easily and quickly opened and closed with a minimum of effort on the part of the operator.

Another object of the invention is to provide an improved vehicle body construction of the convertible top type that is economical to manufacture and assemble, durable, efficient and pleasing in appearance.

Still another object of the invention is to provide an improved vehicle body construction of the convertible top type that incorporates an improved top operating mechanism which facilitates opening and closing the relatively inflexible top.

Another object of the invention is to provide an improved vehicle body construction of the convertible top type having an improved top member which may be readily adapted to various body styles and sizes and which, when closed, effectively prevents the entrance of moisture, dust and other foreign material into the passenger-carrying compartment of the vehicle.

Yet another object of the invention is to provide an improved body construction of the convertible top type which may be easily heated with a conventional vehicle heater when the ambient atmosphere is at a low temperature.

The above as well as other objects and advantages of the invention will become apparent from the following description taken in conjunction with the accompanying drawings wherein.

Figure 1:
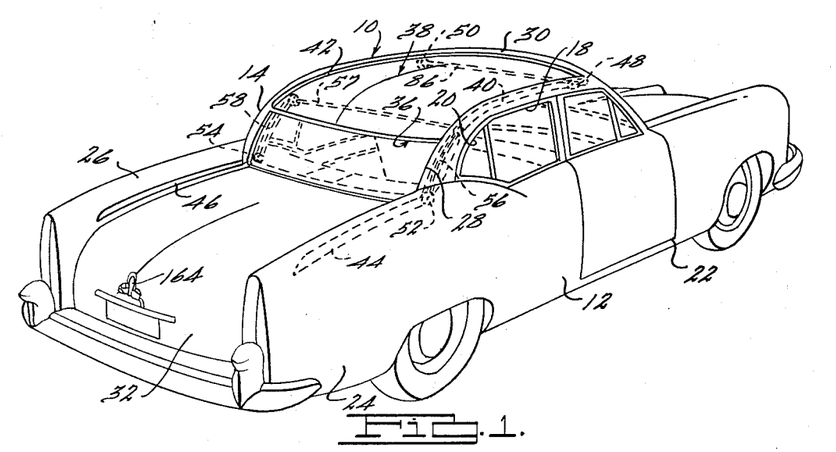
Fig. 1 is a perspective view of a vehicle incorporating one embodiment of the present invention, with the top in the closed position.
Figure 2:
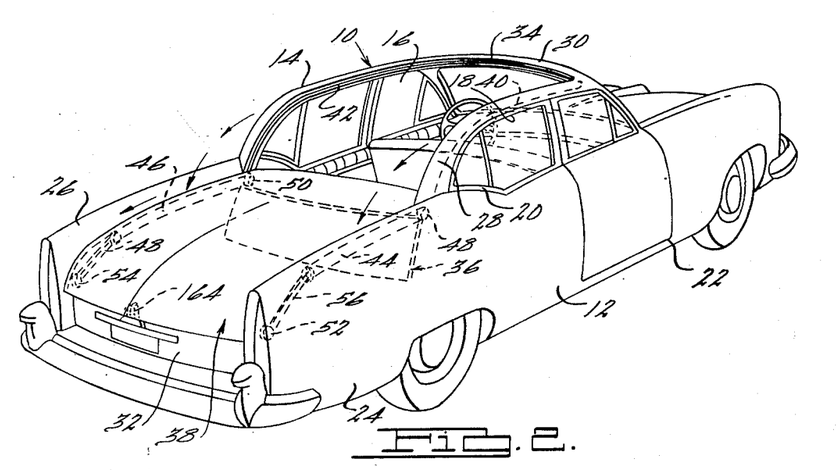
Fig. 2 is a perspective view similar to Fig. 1 but showing the top in the open position.
Figures 3, 4, 5:
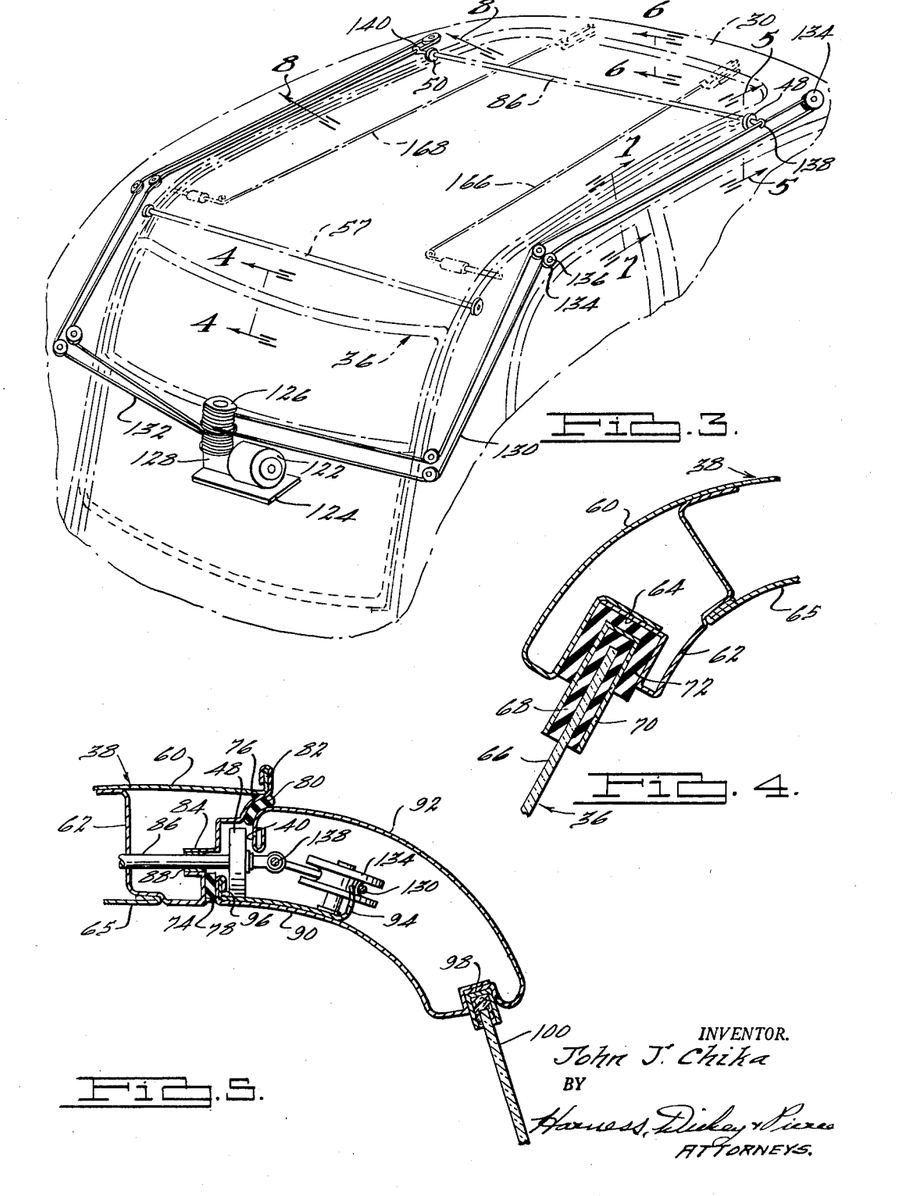
Fig. 3 is a fragmentary, enlarged, perspective view of a portion of the structure illustrated in Fig. 1 and showing one form of the top operating mechanism.
Fig. 4 is an enlarged, fragmentary, sectional view of a portion of the structure shown in Fig. 3, taken on the line 4—4 thereof.
Fig. 5 is an enlarged, fragmentary, sectional view of a portion of the structure shown in Fig. 3, taken on the line 5—5 thereof.

Referring to the drawings and more particularly to Figs. 1, 2 and 3, an automotive vehicle is shown, although it will be understood that the present invention is applicable to other uses. The vehicle is shown as provided with a body, generally designated 10, having a pair of spaced side panels 12 and 14, the central portions of which define a passenger compartment 16. The passenger compartment is provided with window openings, such as 18 and 20, and a door opening 22 while the rear quarter sections 24 and 26 of the side panels are shaped to define elongated fenders which extend rearwardly of the passenger compartment 16. The upper portions of the central and rear quarter sections of the side panels 10 and 12 extend substantially longitudinally of the vehicle and are joined by an integral sloping portion 28. A header structure 30 is welded or otherwise secured to the side panels at a position near, but forwardly spaced from, the door opening 22 while a rear trunk deck lid 32 extends transversely of the rear quarter sections 24 and 26 and is hingedly secured to the side panels by any suitable means. Such a construction defines an opening 34 in the top and rear portions of the passenger compartment 16 which is closed by a rear window structure 36 and a top or closure member 38, the constructions of which will be hereinafter described in greater detail.

A pair of oppositely disposed tracks 40 and 42 are formed on the inner sides and at the top of the central sections of the side panels 12 and 14, such tracks extending rearwardly over the passenger compartment and curving downwardly so as to substantially follow the configuration of the sloping portions 28 on the side panels. A pair of tracks 44 and 46 are formed in the inner sides of the fender defining rear quarter sections 24 and 26 of the side panels and extend rearwardly in vertically spaced relationship with respect to the tracks 40 and 42, the tracks 44 and 46 curving downwardly so as to substantially follow the configuration of the trunk deck lid 32.

The top member 38 is of such a size as to substantially fill the opening 34 defined by the upper portions of the side panels and the header structure 30. The front portion of the top member 38 is mounted on a pair of rollers 48 and 50 which extend outwardly from opposite sides of the top member 38 and travel in the tracks 40 and 42, respectively. For the purpose of supporting the rear portion of the top member 38, a pair of rollers 52 and 54 are provided which travel in the tracks 44 and 46, respectively. The roller 52 is rotatably mounted on one end portion of an elongated arm 56 while the other end portion of the arm 56 is pivotally connected to one end portion of a rod 57 fixed to the top member 38 and extending transversely thereof. The roller 54 is rotatably mounted on one end portion of an arm 58 while the distal end portion of the arm 58 is pivotally connected to the end portion of the rod 57 opposite that pivotally connected to the arm 56.

As shown in Fig. 4, the top member 38 includes a relatively rigid sheet 60 and a generally channel-shaped frame 62, each of which may be formed of metal, plastic, laminated fiber glass or other relatively inflexible material. The frame 62 extends around the periphery of the sheet 60 and serves to stiffen the sheet, the inner flange portion of the frame 62 being fixed to the lower surface of the sheet 60 while suitable reinforcing elements (not shown) are secured to the sheet 60 and frame 62 to strengthen the top member 38. The lower surface of the top member 38 is exposed to the passenger compartment when the top member is in the closed position and in order to conceal the reinforcing elements and provide a pleasing appearance, a liner 65 is provided which may be made from any suitable material. The liner extends in substantially parallel relationship with the sheet 60 and the edge portions of the liner are secured to the frame in any suitable manner. The rear end portions of the sheet 60 and frame 62 are bent and joined in overlapping relation, by welding or other suitable means, so as to define a transversely extending U-shaped recess 64 which extends substantially the entire width of the top member. The rear window structure 36 is comprised of a transparent plate 66, which may be formed from safety glass or other suitable material, and is encompassed by a resilient U-shaped sealing member 68 and a metallic U-shaped molding 70, the molding 70 slidably engaging a U-shaped sealing member 72 secured in the recess 64. The window structure 36 is slidably mounted in the tracks 40 and 42 and may be moved upwardly so as to snugly fit the sealing member 72 to seal the rear sloping portion of the passenger compartment when the top 38 is in the closed position. The window structure 36 may be opened and moved downwardly in the tracks 40 and 42 so that it is disposed in the forward portion of the trunk of the vehicle when it is in the fully opened position.

Figures 6, 7:
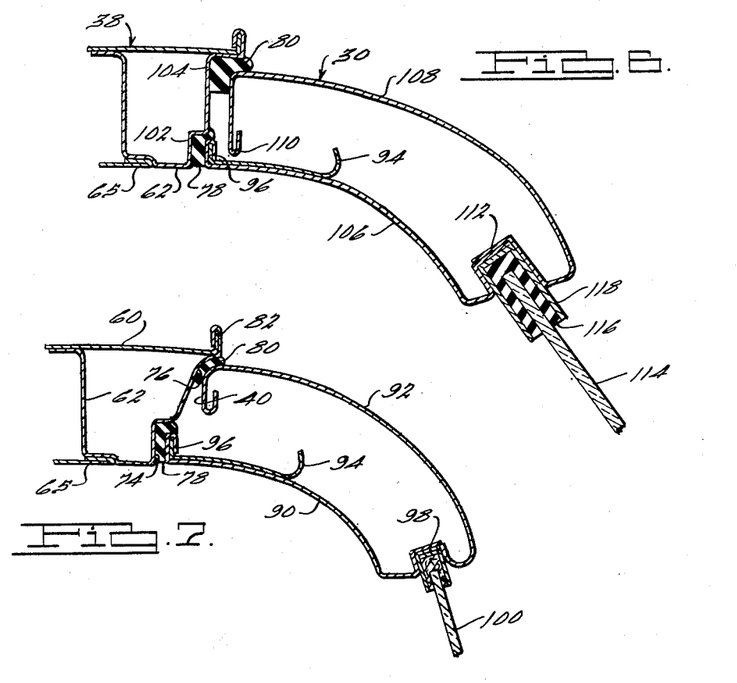
Fig. 6 is an enlarged, fragmentary, sectional view of a portion of the structure shown in Fig. 3, taken on the line 6—6 thereof.
Fig. 7 is an enlarged, fragmentary, sectional view of a portion of the structure shown in Fig. 3, taken on the line 7—7 thereof.

The side portions of the top member are of the cross-sectional contour illustrated in Figs. 5 and 7. The side portions of the frame 62 of the top member are bent upwardly to define recesses 74 and 76 which accommodate a pair of sealing members 78 and 80, respectively, and the outer portion of the frame 62 is return bent over an upwardly extending flange 82 formed on the sheet 60. A hub portion 84 is formed intermediate the recesses 74 and 76 in the forward portion of the frame 62 and is adapted to accommodate a transversely extending axle 86 rotatably mounted in sleeve bearings 88.

The outer end portion of the axle 86 carries the roller 48 which travels in the track 40 while the roller 50 is similarly mounted on the opposite side of the top member and travels in the track 42. As shown in Fig. 5, the track 40 is defined by the inner and outer sheets 90 and 92 of the side panel 12. The inner end portion of the inner sheet 90 terminates inwardly from the inner end portion of the outer sheet 92 which extends downwardly and is return bent in the cross-sectional shape of a reversed J. A drip molding 94 is secured to the inner surface of the inner sheet 90 and the inner end of the inner sheet 90 is return bent over the upwardly extending flange 96 of the drip molding. The drip molding 94 extends transversely of the front portion of the passenger compartment and longitudinally of the side portions and is opened to the atmosphere at suitable low points to permit draining of fluids conveyed thereby.

The resilient sealing members 78 and 80 are secured in the recesses 74 and 76, respectively, on each side of the vehicle and function to form a seal between the top member and the side panels when the top member is in the closed position.

The outer end portions of the inner and outer side panel sheets 90 and 92 are bent and joined in overlapping relation, as by welding, to define a U-shaped recess 98 adapted to receive side windows, such as 100, which may be formed in a manner similar to the rear window and which may be operated by conventional window regulators (not shown).

The front portion of the top member 38 is of the cross-sectional contour shown in Fig. 6. The front portion of the frame 62 is bent upwardly to define a pair of stepped recesses 102 and 104 which are aligned with the recesses 74 and 76, respectively, in the side portions of the top member. The recesses 102 and 104 are adapted to accommodate the sealing members 78 and 80 which form a seal between the front portion of the top member and the header structure 30 when the top member is in the closed position.

The header structure 30 is comprised of inner and outer sheets 106 and 108, the inner portion of the inner sheet 106 terminating inwardly from the inner end portion of the outer sheet 108 which extends downwardly and is return bent, as at 110. The inner end portion of the inner sheet 106 is return bent over the upwardly extending flange 96 of the drip molding 94 to secure the transversely extending portion of the drip molding. The front end portions of the sheets 106 and 108 are bent and joined in overlapping relationship so as to define a U-shaped recess 112 which encompasses the windshield 114, preferably formed of safety glass. A resilient U-shaped member 116 and a U-shaped molding 118 encompass the windshield 114 and the molding 118 is secured in the recess 112 by any suitable means.

Figure 8:
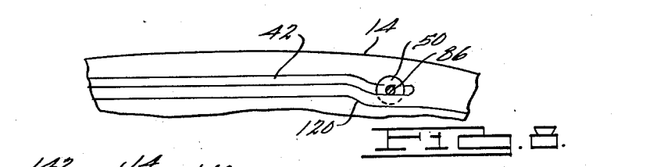
Fig. 8 is an enlarged, fragmentary, side elevational view of a portion of the structure illustrated in Fig. 3, taken on the line 8—8 thereof.

In order to insure a snug fit between the sealing members 78 and 80 and the side panels 12 and 14 and the header structure 30, a dip 120 is formed in the tracks 40 and 42, as shown in Fig. 8, so as to seat the sealing members 78 and 80 when the top 38 is in the closed position.

The top member 38 is proportioned to bridge and complete a top closure for the passenger compartment when the top is in the substantially horizontal closed position. The top is also proportioned so as to be slightly smaller than the deck lid 32 and is movable to a substantially horizontal open position overlying the deck lid 32 intermediate the rear quarter sections 24 and 26 of the side panels.

For the purpose of providing means for automatically opening and closing the top member 38, a reversible D. C. electric motor 122 is provided which is preferably disposed in an unobtrusive portion of the vehicle, as for example, in the forward portion of the trunk and is connected to a suitable source of potential, such as the vehicle battery, through an actuating switch (not shown). It will be understood that any reversible motor may be utilized to provide the force necessary to move the top member 38 and it will, of course, be understood that the top member 38 could be moved manually or hydraulically. The motor 122 is fixed to a stationary base 124 or other stationary component of the vehicle and the drive shaft of the motor drives a windlass drum 126 through a conventional gear reduction unit 128.

In the preferred construction illustrated in Fig. 3, a pair of endless cables 130 and 132 are provided which are movable in response to the actuation of the windlass drum 126. The cable 130 is fixed to the outer end portion of the axle 86 adjacent the roller 48, the cable being guided by suitable spaced pulleys 134 rotatably mounted on headed pins 136 fixed to the side panels 12 and 14. When the top member is in the closed position and the windlass drum 126 is rotated in a counterclockwise direction, as viewed in Fig. 3, the fixed points 138 and 140 on the cables 130 and 132, respectively, move rearwardly relative to the side panels 12 and 14, thereby moving the top member 38 rearwardly to the open position. When the top member 38 is in the open position and the windlass drum is rotated in a clockwise direction, the fixed points 138 and 140 on the cables move forwardly relative to the side panels and move the top member to the closed position.

In order to latch the top member 38 in the open position, a spring biased detent 164 is secured to the rear portion of the trunk deck lid 32 and automatically engages a suitable recess provided in the rear end portion of the top member 38 as the top member moves to the open position.

For the purpose of positively locking the top member 38 in the closed position, a pair of conventional, manually actuated locking mechanisms 166 and 168 are provided which positively lock the rear and front portions of the top member to the side panels 12 and 14 and the header structure 30, respectively.

As to the operation of this form of the invention, assuming that the top member 38 is in the closed position, as viewed in Fig. 1, the rear window structure 36 is moved downwardly in the channels 40 and 42 to the open position and the locking mechanisms 166 and 168 are released. The top member 38 may then be opened and positioned to overlie the trunk deck lid 32 by applying a rearwardly directed force to the top member. The opening movement of the top member 38 is best understood by considering such movement in increments. As the top member is initially moved rearwardly, the rollers 48 and 50 roll in the tracks 40 and 42, respectively, while the rollers 52 and 54 remain susbtantially stationary in the tracks 44 and 46. The arms 56 and 58 then pivot about the axes of the rollers 52 and 54 and about the axis of the transversely extending rod 57 so as to swing the rear portion of the top 38 outwardly and downwardly. As the top continues to move rearwardly, the rear portion of the top moves downwardly toward the deck lid 32 so that the rod 57 is spaced rearwardly from the rollers 52 and 54. The rearward component of force applied to the top member then causes the rollers 52 and 54 to roll rearwardly in the tracks 44 and 46 while the front portion of the top member moves downwardly as the rollers 48 and 50 follow the downwardly curving portions of the tracks 40 and 42. The top member then continues to move to the fully open position so that it overlies the trunk deck lid 32 intermediate the rear quarter sections 24 and 26 of the side panels. The proportioning of the top member 38 is such that when in the closed position, the top member functions as a closure member for the passenger compartment and when in the open position, it overlies and closely fits the deck lid 32, preferably filling the space between the rear fenders, thereby providing a pleasing appearance in both the open and closed positions. The length and curvature of the top member are susbtantially similar to the length and curvature of the deck lid but the rear end portion of the top member terminates at a position spaced from the rear end of the deck lid at a distance sufficient to permit a license plate to be exposed and to provide space for the latching member 164 to be secured to the rear end portion of the deck lid.

Figure 9:
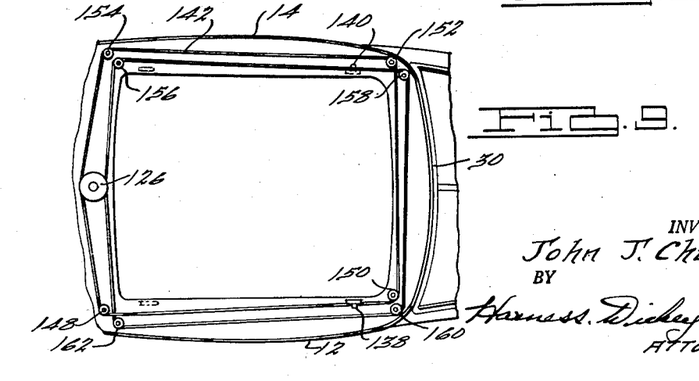
Fig. 9 is a top plan view of another form of the top operating mechanism.

Another form of cable arrangement is schematically illustrated in Fig. 9. In this form of the invention a single endless cable 142 is provided with is outwardly spaced from and encompasses the top member 38, the cable being fixed to both end portions of the axle 86 at the points 138 and 140 adjacent the rollers 48 and 50. Commencing with the windlass drum 126, the cable 142 extends transversely of the top member 38 and passes over the inner pulley 148, after which it extends longitudinally of the top member and passes over the pulley 150. The cable then extends transversely of the forward portion of the top member, over the pulley 152, longitudinally along the opposite side of the top member, over the pulley 154 and transversely of the rear portion of the top member to the windlass drum 126. The cable is coiled around the drum 126 for several turns, after which it extends transversely of the rear portion of the top member, over the pulley 156, longitudinally along one side of the top member, over the pulley 158, after which it follows an obvious path back to the windlass drum 126 over the pulleys 160, 162. With such a construction, the top member 38 is moved to the open position when the windlass drum is rotated in a clockwise direction, as viewed in Fig. 9, and to a closed position from the open position when the windlass drum is rotated in a counterclockwise direction.

Figure 10:
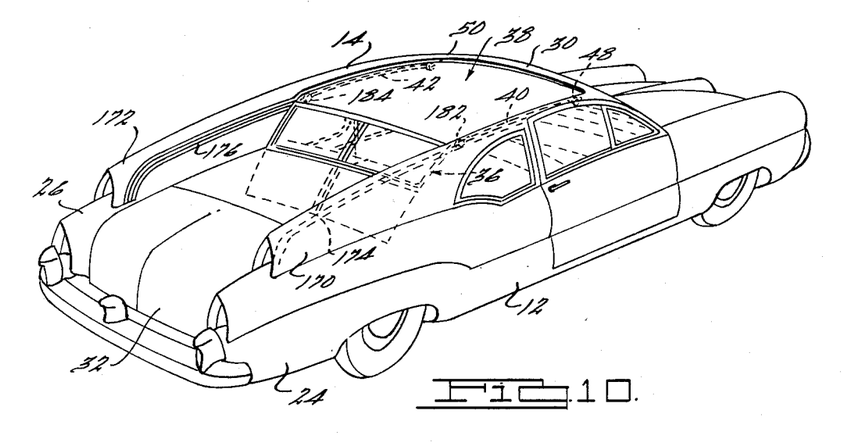
Fig. 10 is a perspective view of a vehicle incorporating another form of the invention, with the top in the closed position.
Figure 11:
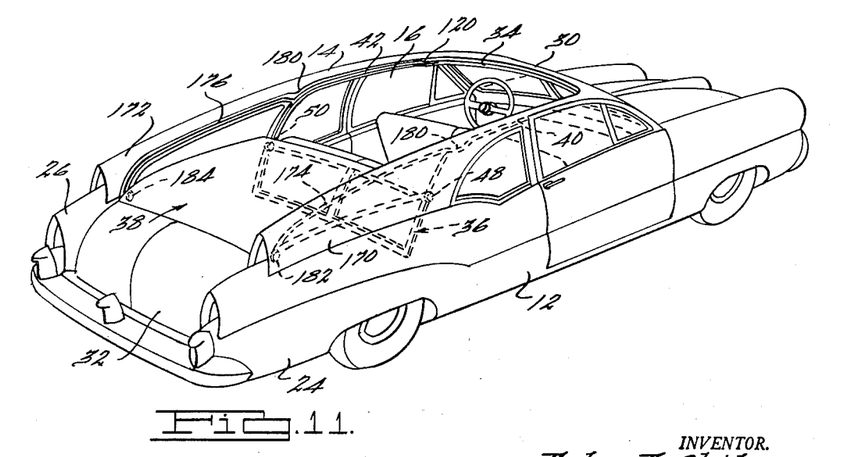
Fig. 11 is a perspective view similar to Fig. 10, but showing the top in the open position.

Another embodiment of the invention, the style of which is disclosed and claimed in applicant's Design Patent No. 161,001, issued November 28, 1950, is shown in Figs. 10 and 11. In this form of the invention, the upper portions 170 and 172 of the side panels 12 and 14 are extended rearwardly over the fenders defined by the rear quarter section 24 and 26 and terminate at a position forwardly spaced from the rear ends of the fenders. A pair of tracks 174 and 176, which may be formed in the manner previously described, are provided in the upper portions 170 and 172. The tracks 174 and 176 extend rearwardly from the tracks 40 and 42, the forward ends of the tracks 174 and 176 junctioning with the tracks 40 and 42 to provide, in effect, an open switch, while the rear end portions of the tracks 174 and 176 slope downwardly at a position near, but spaced from, the rear ends of the upper portions 170 and 172 so that the rear ends of the tracks terminate adjacent the deck lid 32. In this form of the invention, the tracks 40 and 42 are each provided with a dip 180, in addition to the dip 120, to assure a snug fit between the sealing members carried by the top member 38 and the side panels and windshield defining structure when the top member 38 is in the closed position. The rear window structure 36 is slidably mounted in the lower end portions of the tracks 40 and 42 and may be moved upwardly to snugly fit the sealing member 72 to close the rear portion of the passenger compartment when the top member 38 is in the closed position.

The front corner portions of the top member 38 are carried by the rollers 48 and 50 in the manner previously described while the rear corner portions of the top member are carried on rollers 182 and 184 which may be mounted similarly to the rollers 48 and 50. The rollers 48 and 50 are disposed in the dips 120 while the rear rollers 182 and 184 are disposed in the dips 180 in the tracks 40 and 42 when the top is in the closed position.

In the operation of this form of the invention, the rear window is moved downwardly in the tracks 40 and 42 to the position shown in Fig. 11, after which the top member may be opened by applying a rearwardly directed component of force to such member. While the junction of the tracks 174 and 176 with the tracks 40 and 42, respectively, provides, in effect, a pair of open switches, the top 38 is relatively inflexible so that the rollers 182 and 184 are free to move rearwardly only in the tracks 174 and 176 and are prevented from moving downwardly in the rearwardly sloping portions of the tracks 40 and 42 because of the rigidity of the top 38. As the top member 38 moves rearwardly, the rollers 182 and 184 travel in the tracks 174 and 176 while the rollers 48 and 50 travel in the tracks 40 and 42. The length of the tracks 174 and 176 is such that when the rollers 48 and 50 reach the junction of the tracks 174 and 176 with the tracks 40 and 42, respectively, the rollers 182 and 184 reach the downwardly curving portion of the tracks 174 and 176 and the rigidity of the top member 38 causes the rollers 48 and 50 to follow the downwardly sloping portion of the tracks 40 and 42. The top member 38 then moves downwardly until it overlies the deck lid 32 intermediate the fender defining rear quarter sections 24 and 26, as brought out in Fig. 11.

Figure 12:
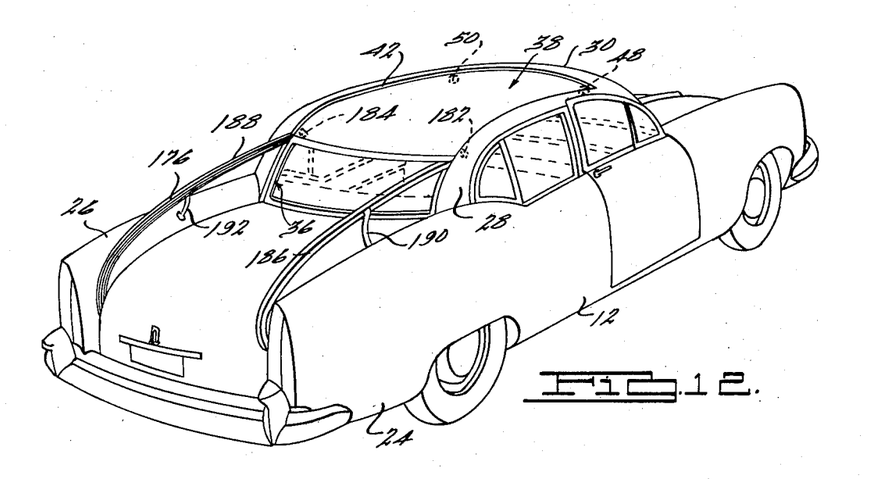
Fig. 12 is a perspective view of a vehicle incorporating still another form of the invention, with the top in the closed position.
Figure 13:
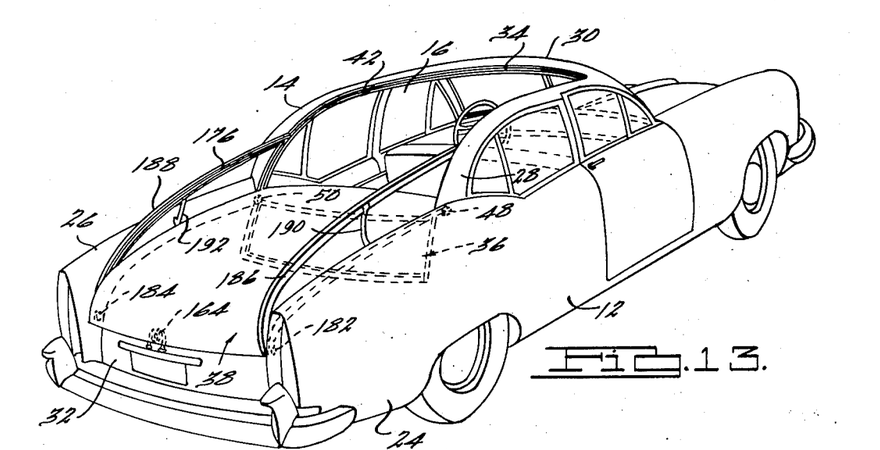
Fig. 13 is a perspective view similar to Fig. 12, but showing the top in the open position.

Another embodiment of the invention is illustrated in Figs. 12 and 13. In this form of the invention, however, the tracks 174 and 176 are defined by a pair of rearwardly extending struts 186 and 188. While in the preferred construction, the outer surfaces of the struts are shown as being relatively smooth, it will be understood that such surfaces may be configured to suit the wishes of the designer.

The rear end portions of the struts 186 and 188 are fixed to the rear quarter sections 24 and 26 at a position forwardly spaced from the rear ends thereof while the front end portions of the struts are fixed to the sloping portion 28 of the side panels 12 and 14 so that the tracks 174 and 176 junction with the tracks 40 and 42, respectively, to form a pair of open switches, in the manner previously described. The central portions of the struts 186 and 188 are supported by downwardly extending arms 190 and 192, the upper end portions of which are fixed to the struts 186 and 188, respectively, while the lower end portions are fixed to the adjacent rear quarter sections of the side panels.

The operation of this form of the invention is similar to the form of the invention disclosed in Figs. 10 and 11.

Figure 14:
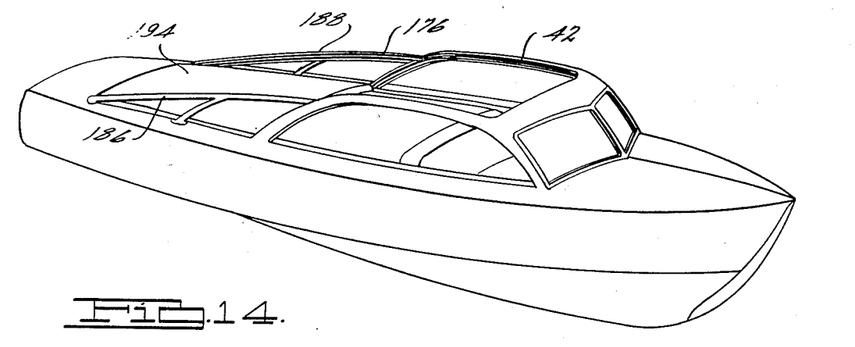
Fig. 14 is a perspective view of a body incorporating another form of the invention, with the top in the open position.
Figure 15:
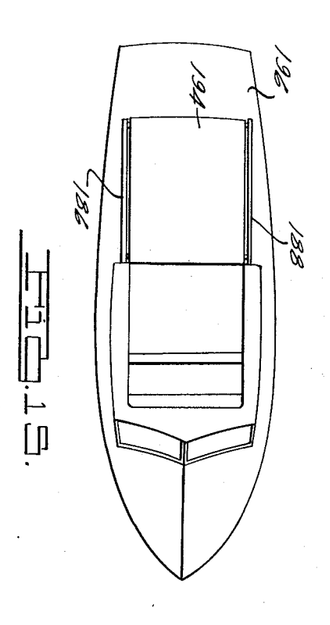
Fig. 15 is a top plan view of the structure shown in Fig. 14.

Figs. 14 and 15 illustrate the applicability of the form of the invention disclosed in Figs. 12 and 13 to a boat of the cabin cruiser type. In this form of the invention, however, the top 194 is shaped so as to be of substantially the same shape as the portion of the deck 196 extending rearwardly from the cabin intermediate the rearwardly extending struts so that the top, when open, lies substantially flat on the deck.

While preferred embodiments of the invention have been shown and described, it will be understood that various changes and modifications may be made without departing from the spirit and scope of the invention.

What is claimed is:

1. A convertible vehicle construction comprising, in combination, a body having a mid portion bounded by fixed side window and front windshield structure defining a passenger compartment, the rear end of said body defining an end compartment having a top positioned lower than the top of said window and front windshield structure, a rigid, bodily displaceable roof member bridging said passenger compartment, said roof member being proportioned to complete a top closure for said passenger compartment and being not materially longer than said rear compartment top and movable to two overlying, substantially horizontal positions, one such position being a raised, forward position overlying the passenger compartment and the other position being a lowered position nearer the rear end of the vehicle and overlying said rear end compartment, a downwardly displaceable rear window for the passenger compartment, said rear window being proportioned to complete a rear closure for said passenger compartment, actuating and guiding means for moving said roof member both horizontally and vertically while maintaining the same in a substantially horizontal position during its movement over the passenger compartment, said guiding means comprising track portions extending longitudinally along and continuously between the upper portions of the two compartments, longitudinally spaced rolling members secured to said roof member and co-acting with said track portions to guide said roof member during movement thereof, and means for holding said roof member in either of said two overlying positions.

2. A vehicle body construction comprising a supporting structure having an opening defining a passenger compartment therein and an end portion extending longitudially and rearwardly of the opening, a pair of elevated longitudinal track portions carried by said supporting structure on opposite sides of said opening, a pair of longitudinal track portions on opposite sides of said end portion and positioned lower than said first-mentioned track portions, a relatively inflexible, displaceable closure member for the opening, means connecting said closure member to said supporting structure for longitudinal and vertical movement to and from covering relationship with respect to said opening and to said end portion comprising a first pair of track-engaging rollers journaled on fixed transverse axes on opposite sides of the forward end portion of said closure member, a second pair of track-engaging rollers, a pair of link arms, one of said last-mentioned rollers journaled on one end portion of each of said link arms, the other end portion of each of said link arms pivotally connected to said closure member adjacent the rear end portion thereof.

3. In a vehicle body having an opening defining a passenger compartment therein, a supporting structure encompassing the opening and provided with an end portion extending rearwardly from the opening, a first pair of track portions carried by said supporting structure above and on opposite sides of the opening, a pair of elongated struts fixed to said supporting structure and extending longitudinally thereof on opposite sides of said rearwardly extending portion, said struts defining a second pair of track portions the forward end portion of which junction with said first pair of track portions intermediate the ends thereof and extending downwardly and rearwardly therefrom, a relatively rigid displaceable closure member for the opening, means connecting said closure member to said supporting structure and said struts for movement to and from covering relationship with respect to said opening and to said rearwardly extending portion comprising a plurality of rollers, one of said rollers journaled on a fixed transverse axis at each corner portion of said closure member, said rollers adapted to engage said track portions and move longitudinally thereof while supporting said closure member.

4. A body construction comprising a supporting structure having an opening defining a passenger compartment therein and a transverse portion extending longitudinally and rearwardly of the opening, a pair of longitudinal track portions carried by said supporting structure above and on opposite sides of said opening and a pair of longitudinal track portions on opposite sides of said rearwardly extending portion, a relatively inflexible, displaceable closure member for the opening, means connecting said closure member to said supporting structure for movement to and from covering relationship with respect to said opening and to said rearwardly extending portion comprising a first pair of track-engaging rollers journaled on fixed transverse axes on opposite sides of the forward end portion of said closure member, a second pair of track-engaging rollers, a pair of link arms, one of said last-mentioned rollers journaled on one end portion of each of said link arms, the other end portion of each of said link arms pivotally connected to said closure member adjacent the rear end portion thereof, and means for actuating said closure member comprising a reversible motor, a windlass drum operatively connected to said motor, means for reversibly actuating said motor, and an elongated endless flexible member, a portion of said flexible member fixed to said closure member, said flexible member being movable in response to rotary movement of said drum to move said closure member to and from the open and closed positions.

5. In a convertible vehicle body including a midportion bounded by upstanding side and front framing structure defining a passenger compartment, a rear compartment portion having a top positioned lower than the top of said framing structure, a rigid, bodily displaceable roof member for the passenger compartment, said roof member being proportioned to complete a top closure for said passenger compartment and being not materially longer than said rear compartment top and movable to two overlying substantially horizontal positions, one such position being a raised, generally central position overlying the passenger compartment and the other position comprising a lowered position nearer the end of the vehicle and overlying said rear compartment, actuating and guiding means for moving said roof member both horizontally and vertically while maintaining the same in a substantially horizontal position during its movement over the passenger compartment, said guiding means comprising forward transversely spaced tracks extending longitudinally along the upper portions of said passenger compartment and extending downwardly at their rear ends to a position adjacent the forward end of the top of said rear compartment, rearward transversely spaced tracks adjacent said rear compartment, forward track-engaging means on the forward portion of said roof member coacting with said forward tracks, and rearward track-engaging means coacting with said rearward tracks and pivotally connected with the rearward portion of said roof member at a position spaced substantially above the top of said rear compartment when said roof member is in its central position.

6. A convertible vehicle body as defined in claim 5 wherein said rearward tracks are disposed adjacent the sides of said rear compartment top and wherein said rearward track-engaging means comprises links pivotally connected with said roof member at one end and having rollers at their opposite ends engaged within said rearward tracks.

7. A convertible vehicle body as defined in claim 5 wherein said rearward track-engaging means comprises rollers journaled on said roof member at said position of pivotal connection and wherein said rearward tracks are disposed in a position to receive said rollers and extend rearwardly and downwardly therefrom.

References Cited in the file of this patent

UNITED STATES PATENTS

| 1,722,227 | Lukesh | July 23, 1927 |
| 2,051,140 | Grimston | Aug. 18, 1936 |
| 2,462,667 | O'Neal | Feb. 22, 1949 |
| 2,575,864 | Croucher | Nov. 20, 1951 |
| 2,694,598 | Ulrich | Nov. 16, 1954 |

FOREIGN PATENTS

| 151,690 | Austria | Nov. 25, 1937 |
| 808,881 | France | Feb. 17, 1937 |
| 282,942 | Great Britain | Jan. 5, 1928 |
| 612,015 | Great Britain | Nov. 8, 1948 |

OTHER REFERENCES

Motor Vehicle Monthly, page 40, May 1926.